United States Patent
Robinson et al.

(10) Patent No.: US 7,425,174 B2
(45) Date of Patent: Sep. 16, 2008

(54) HEAD MEAT SYSTEM

(75) Inventors: Richard K. Robinson, Beardstown, IL (US); Lincoln Woods, Beardstown, IL (US); Michael R. Dallan, Omaha, NE (US); David L. Vance, Omaha, NE (US)

(73) Assignee: Cargill, Incorporated, Wayzata, MN (US)

( * ) Notice: Subject to any disclaimer, the term of this patent is extended or adjusted under 35 U.S.C. 154(b) by 45 days.

(21) Appl. No.: 11/679,366

(22) Filed: Feb. 27, 2007

(65) Prior Publication Data

US 2007/0275646 A1 Nov. 29, 2007

Related U.S. Application Data

(63) Continuation of application No. PCT/US2005/031480, filed on Sep. 1, 2005.

(60) Provisional application No. 60/606,365, filed on Sep. 1, 2004.

(51) Int. Cl.
*A01K 21/00* (2006.01)

(52) U.S. Cl. ...................................... 452/149

(58) Field of Classification Search .............. 452/125, 452/128, 135, 136, 160
See application file for complete search history.

(56) References Cited

U.S. PATENT DOCUMENTS

| 2,436,629 A | | 2/1948 | Carlsen |
| 2,725,593 A | * | 12/1955 | Truffaut ...................... 452/106 |
| 3,084,378 A | | 4/1963 | Macy et al. |
| 4,237,580 A | | 12/1980 | Croasdell |
| 4,918,788 A | * | 4/1990 | Passchier .................... 452/135 |
| 5,512,013 A | * | 4/1996 | Passchier .................... 452/136 |
| 6,306,028 B1 | * | 10/2001 | White et al. ................ 452/135 |

FOREIGN PATENT DOCUMENTS

WO WO 91/19422 A 12/1991

* cited by examiner

*Primary Examiner*—Thomas Price

(57) ABSTRACT

A head meat processing system and a head meat processing method. The processing system includes a rod for receiving and positioning the head, a fastener for grasping a portion of the head and a member for advancing the head onto a horn assembly while the portion is clamped and a horn assembly. The head meat processing method includes positioning a hog head above a fastener, grasping a portion of the head with the fastener, removing the portion from the head, advancing the head having the portion removed along a horn assembly and separating a lower jaw from the head.

41 Claims, 21 Drawing Sheets

HEAD MEAT SYSTEM

CROSS-REFERENCE TO RELATED APPLICATION(S)

This application is a continuation of International Application No. PCT/US2005/031480, filed on Sep. 1, 2005, which claims priority to U.S. Provisional Application No. 60/606,365, filed on Sep. 1, 2004, the contents of both are incorporated by reference in their entirety herein.

FIELD

This invention relates generally to a head meat system, and more specifically to a hog head processing method and system for the harvesting of meat, and more specifically to a hog head processing method and system for removing the snout, ear, skull and jaw bone to harvest meat such as cheek meat, head meat, tongue, snout, or other.

BACKGROUND

The butchering process for hogs requires many steps to separate the parts of a hog and a hog's head for different utilization. As the hog's head moves through the process, the lower jaw is separated and the snout is subsequently removed.

There remains a need for a hog head processing system for removing the snout and separating the lower jaw.

BRIEF SUMMARY

A head meat processing system including a rod for receiving and positioning the head, a fastener for grasping a portion of the head, a member for advancing the head onto a horn assembly while the portion is clamped, and a horn assembly is provided. During advancement of the head onto the horn assembly by the member, the portion clamped is removed from the head and a lower jaw is separated from the head.

Also provided is a head meat processing method including positioning a hog head above a fastener, grasping a portion of the head with the fastener, removing the portion from the head, advancing the head having the portion removed along a horn assembly, and separating a lower jaw from the head.

While multiple embodiments are disclosed, still other embodiments will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 2:
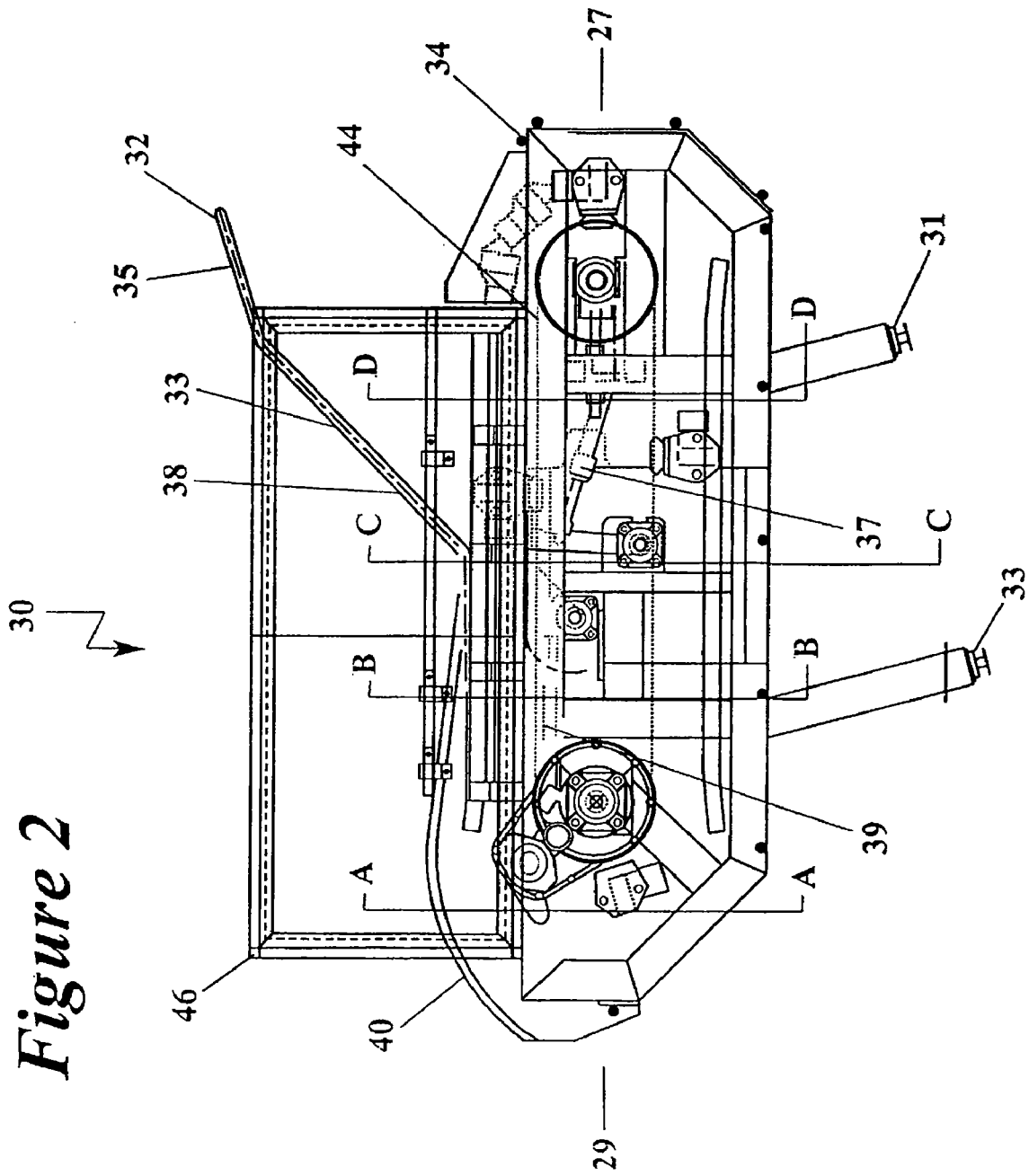
FIG. 2 is a sectional side view of hog head processing system in accordance with one embodiment of the present invention.

An exemplary embodiment of the head meat system is shown in FIG. 2. The system operates to remove the pork snout and break and separate the jaw bone. Using the system, it is possible to have a higher yield percentage of snouts and temple meat than is possible using conventional systems. Also disclosed are several components including a clamp for clamping and removing a snout for a hog head and a horn assembly for separating a lower jaw from a hog head. In addition to hogshead processing, the invention may be used to process heads from other animals, for example from cows.

Figure 1:
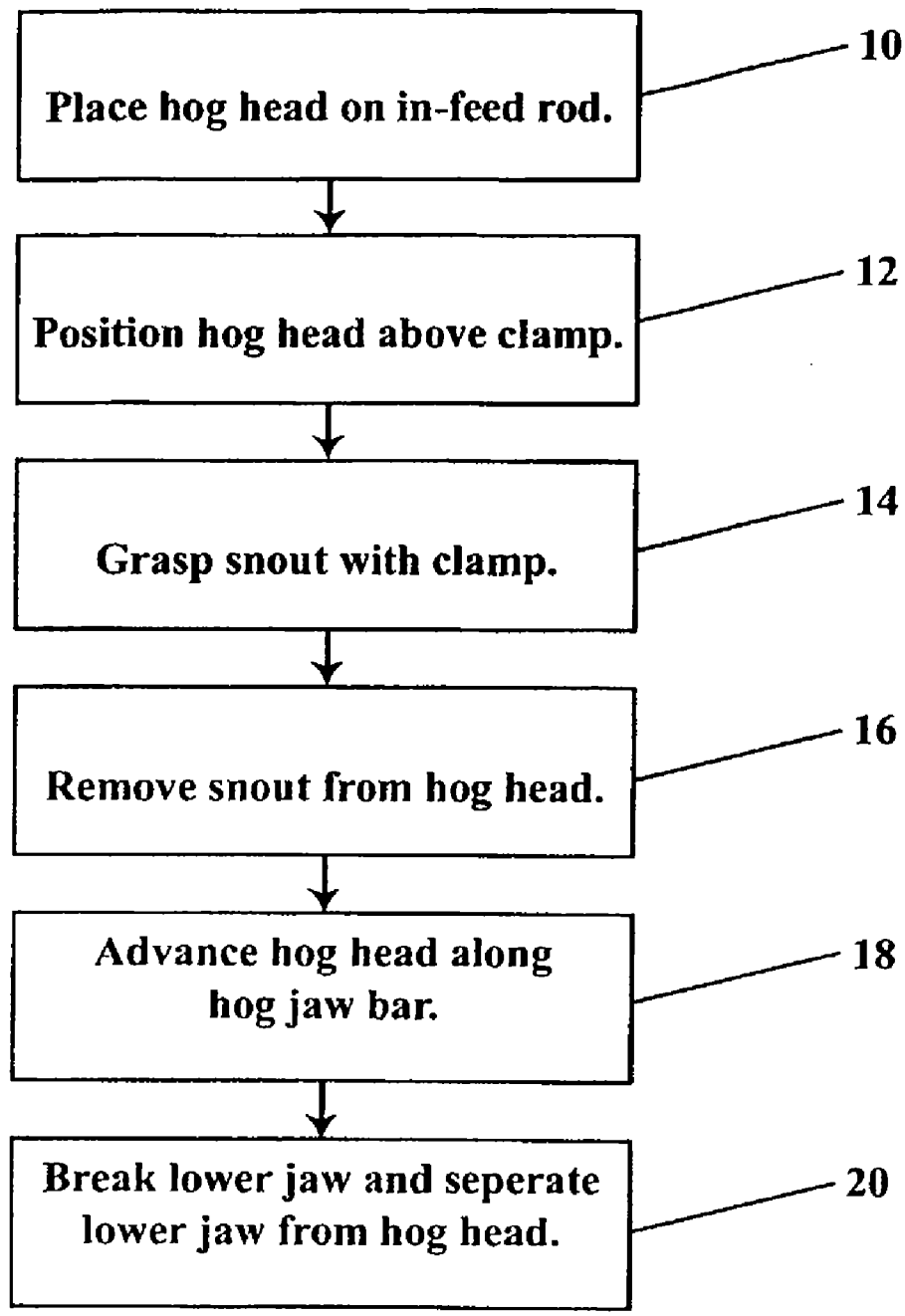
FIG. 1 is a block diagram of a process flow in accordance with one embodiment of the present invention.

FIG. 1 illustrates a method for processing a hog head using the hog head processing system. Prior to the method illustrated, the hog head is removed from the carcass and transverse cuts are made on either side of the hog snout. More specifically, a cut may be made from the mouth to the temple on teach side of the hog head. The skin may then be pulled down or partially removed. The cuts loosen the snout from the front of the upper jaw while keeping the snout attached to the faceplate tissue. While reference is made in passing to various components of the hog head processing system during the description of FIG. 1, the system and components are explained in more detail in relation to FIGS. 2 through 21.

Figure 3:
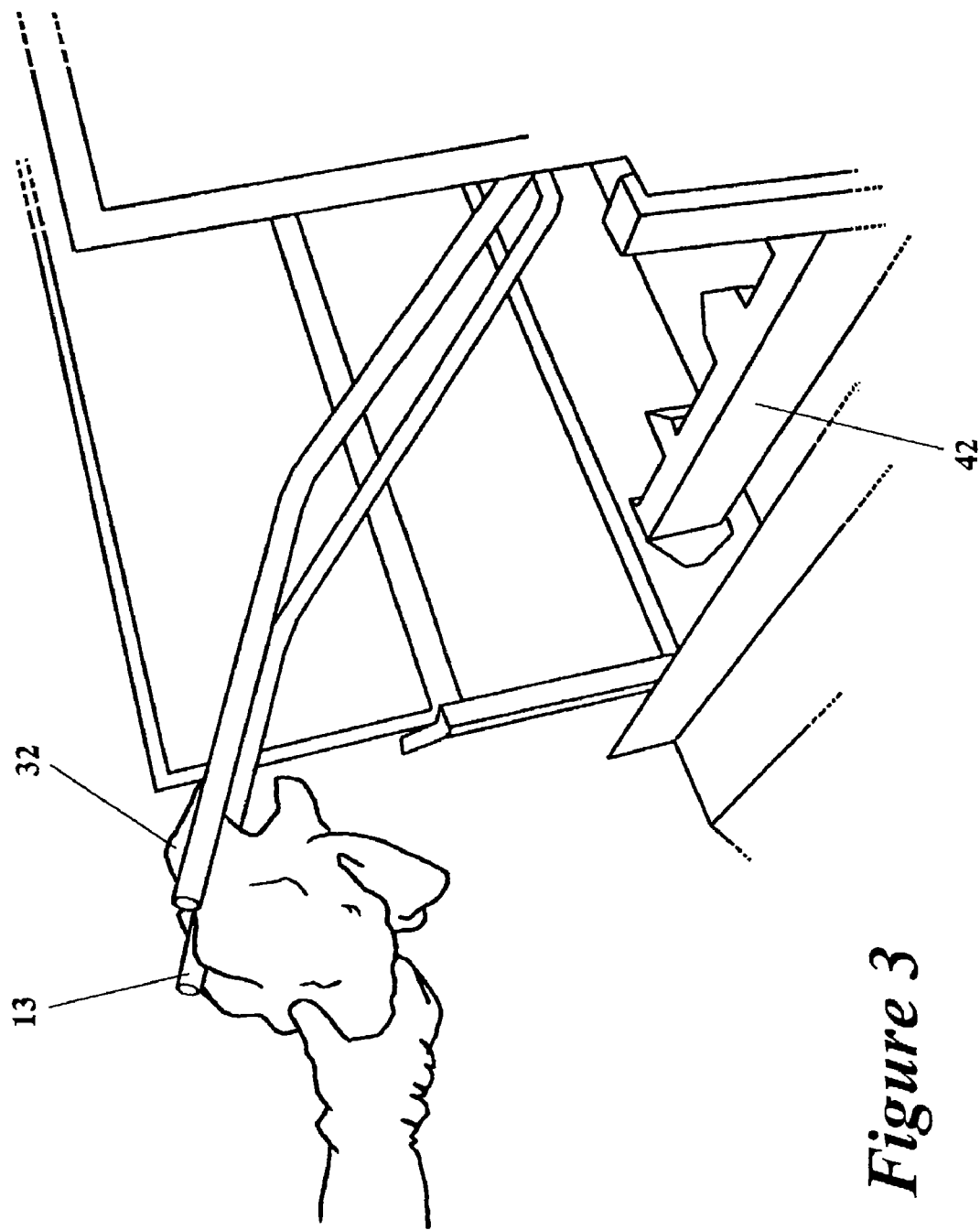
FIG. 3 is a photographic view of a hog head being loaded onto an in-feed rod of a hog head processing system in accordance with one embodiment of the present invention.
Figure 4:
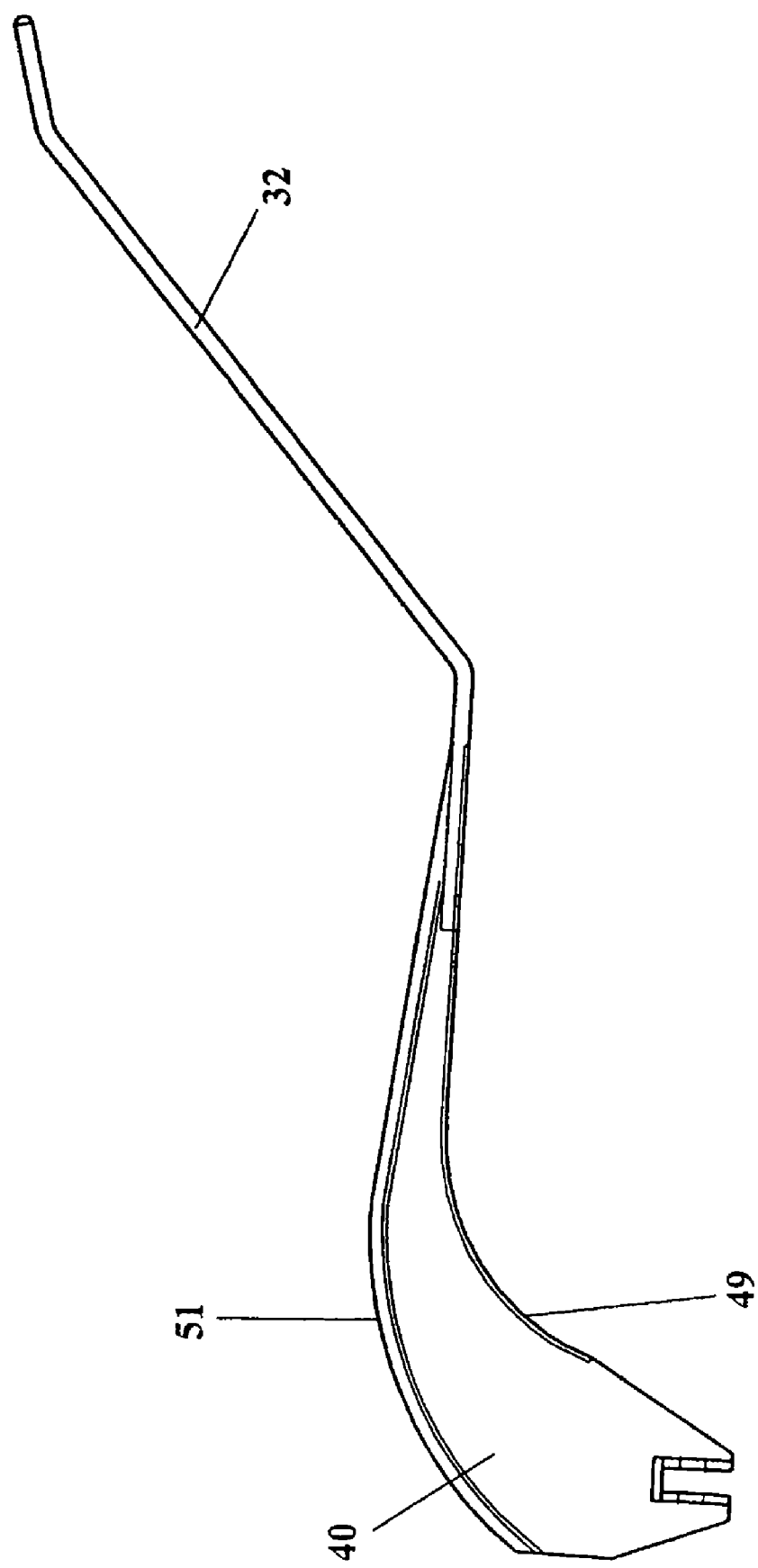
FIG. 4 is a sectional view of an in-feed rod and horn assembly in accordance with one embodiment of the present invention.

As shown at block 10 of FIG. 1, the head 13 is first placed on an in-feed rod 32 shown in FIGS. 2-4. In alternate embodiments, the head 13 may be placed onto a conveyor, track, rail, or other rod for introduction to the hog head processing system 30. Preferably, the head 13 is placed on the rod 32 in an inverted position with the snout facing downwardly towards a surface of the hog head processing system and the lower jaw facing upwardly. To position the hog head 13 on the system, the hog head is placed on the in-feed rod 32 in the inverted position.

Figure 9:
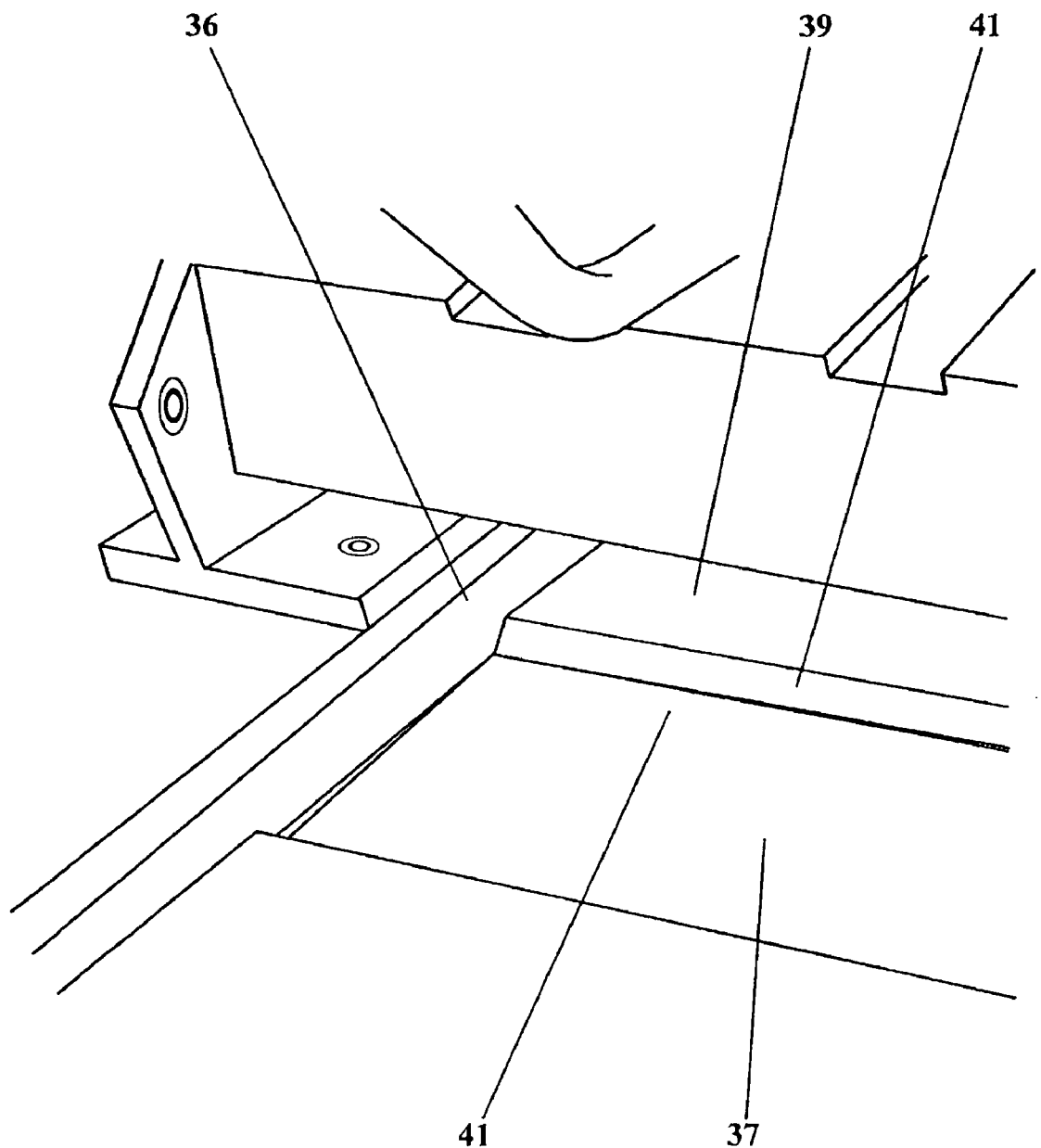
FIG. 9 is a photographic view of a clamp door in accordance with one embodiment of the present invention.
Figure 10:
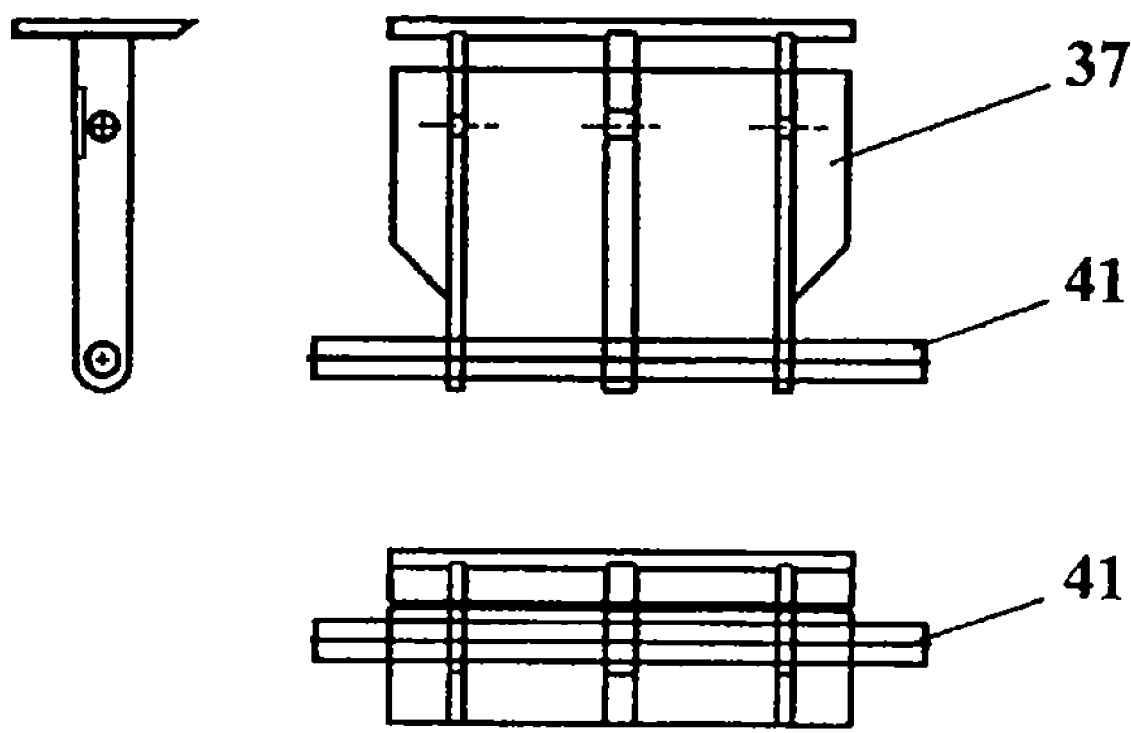
FIG. 10 is a sectional view of a clamp door in accordance with one embodiment of the present invention.
Figure 11:
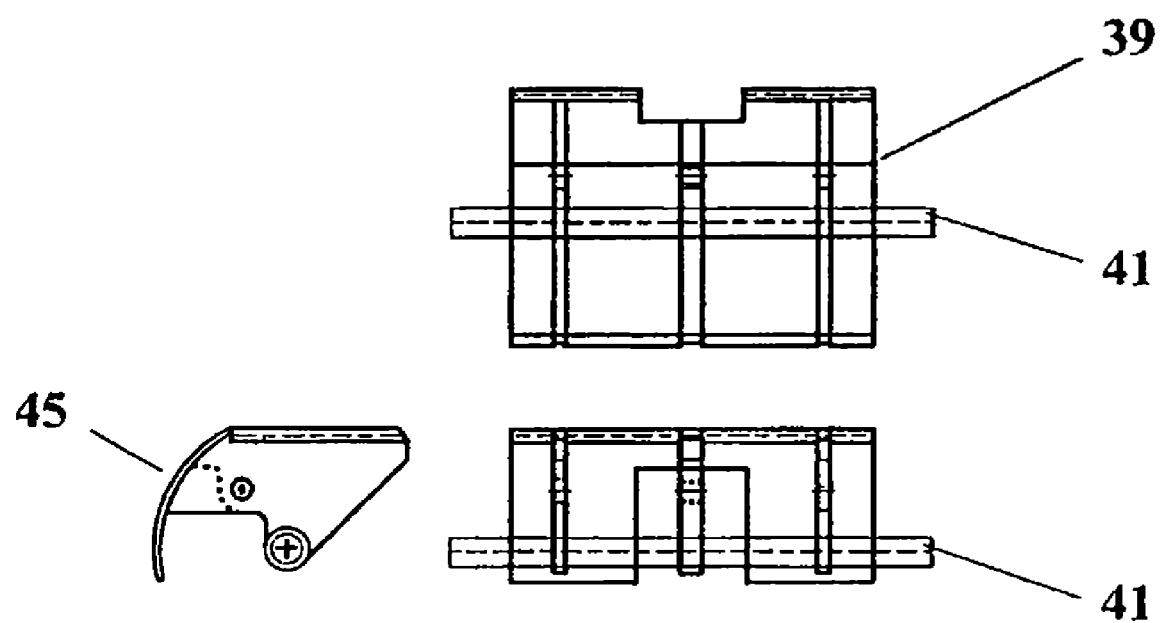
FIG. 11 is a sectional view of a drop door in accordance with one embodiment of the present invention.

The head 13 is advanced along the in-feed rod 32 to come to position above a fasteners, shown as clamp 36, as shown best in FIGS. 9-11 and as referenced in block 12 of FIG. 1. Advancement may be via, for example, gravity-feeding. Once the head 13 is in position above the snout clamp 36, the clamp 36 is actuated to grasp and retain the snout, shown at block 14. The clamp 36, via movement of the clamp 36 or movement of the head 13 while the snout is retained by the clamp 36, is operated to remove the snout from the hog head 13, shown at block 16. Thus, the snout is removed via ripping or tearing from the hog head 13. The snout generally comprises the tip of the nose and the skin over the upper jaw up to the eyes. This is typically a triangular piece of meet including the tip of the nose and approximately eight inches extending therefrom. The snout may be removed from the system by a conveyor or may be removed to a collection device.

After the snout is removed from the hog head, the head 13 is advanced along a horn assembly 40 (FIGS. 4, 5, 7 and 13) as referenced at block 18 of FIG. 1. Advancement of the head 13 along the horn assembly 40 operates to break the lower jaw and separate the lower jaw from the hog head 13, shown at block 20. The separated jaw may be collected at the discharge end 29 of the system 30.

FIG. 2 illustrates one embodiment of a hog head processing system 30. As shown, the hog head processing system 30 is supported by a frame having supports shown as by legs 31 and 33. In one embodiment, the legs 31 are shorter than the legs 33 such that the hog head processing system 30 tilts upwardly from an in-feed end 27 to a discharge end 29. Tilting the system 30 may enhance the advancement of the hog head along the system. However, in an alternate embodiment, the system 30 may be level.

Initially, an operator loads the head in an inverted position onto an in-feed rod 32. The head is positioned with the snout facing downwardly towards a plane 34 of the hog head processing system 30 and the lower jaw facing upwardly. FIG. 3 is a photographic view of a hog head 13 being fed onto an in-feed rod 32. FIG. 4 illustrates an integral in-feed rod 32 and horn assembly 40. The in-feed rod 32 includes a lower end 33 which is positioned at an angle $\alpha_1$ from the horn assembly 40, as shown $\alpha_1$ approximately 45 degrees, and an upper end 35 positioned at an and angle $\alpha_2$ from the lower end 33 of the in-feed rod 32, as shown $\alpha_2$ is approximately 30 degrees. While the angle $\alpha_1$ of the lower end 33 of the in-feed rod 32 may vary, the angle $\alpha_1$ is chosen to enable an operator to feed the head to a location to wherein the head is away from a pusher bar 42 and wherein the clamp 36 is able to grasp and retain the snout. Preferably the angle of the lower end 33 is at least about 45 degrees and more preferably at least about 40 degrees. In one embodiment, the radius of the in-feed rod is approximately 1 inch. The position at which the head 13 is clamped is shown generally at 38 and is proximate the convergence of the in-feed rod 32 and the horn assembly 40. As shown, the in-feed rod 32 and the horn assembly 40 may be integrally formed. Alternately, the in-feed rod 32 and the horn assembly 40 may be integrally formed. Alternately, the in-feed rod 32 and the horn assembly may be coupled. Further, coupling is not necessary provided that the head 13 may be advanced from the in-feed rod 32 onto the horn assembly 40. Initially, the hog head 13 may be advanced along the in-feed rod 32 under the force of gravity. Optionally, a braking system may be included for preventing inadvertent advancement of the hog head 13 passed the clamp 36.

Figure 5:
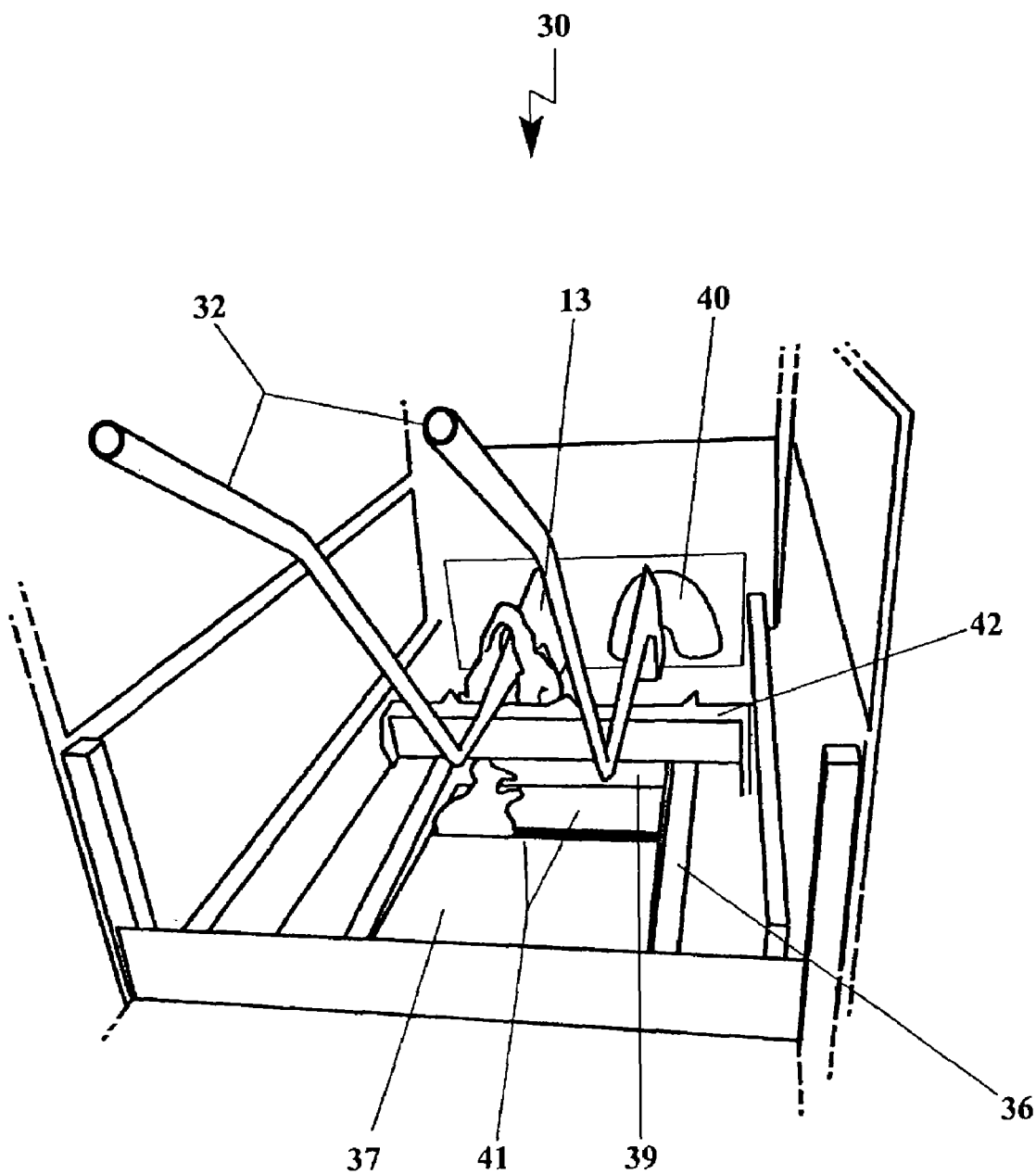
FIG. 5 is a photographic view of a hog head processing system in accordance with one embodiment of the present invention.
Figure 6:
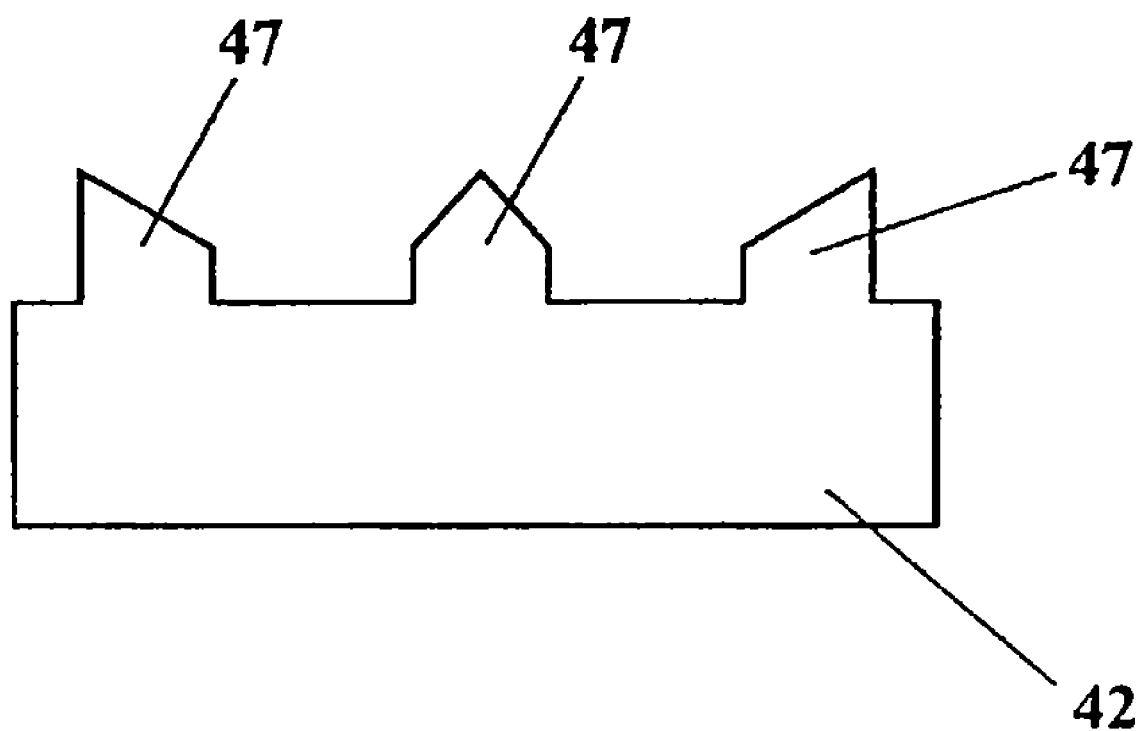
FIG. 6 is a sectional view of a pusher bar in accordance with one embodiment of the present invention.
Figure 7:
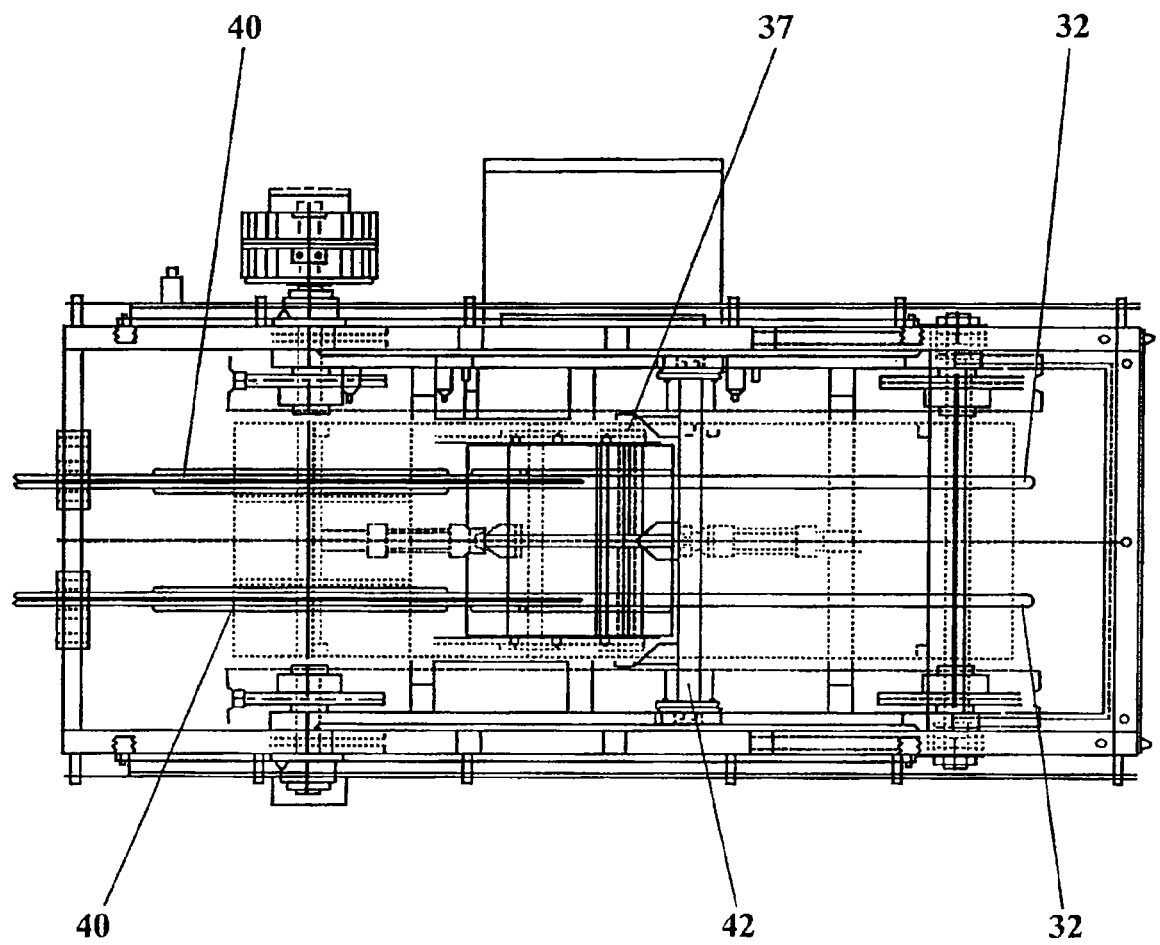
FIG. 7 is a sectional top view of the hog head processing system of FIG. 2.

A pusher bar 42, shown in FIGS. 5, 6 and 7, may be provided to advance the hog head 34 along the system 30, for example, along the horn assembly 40. A plurality of pusher bars 42 may be provided on a track extending around the system 30. Thus, as one pusher bar 42 advances a head 13 along the system 30, another pusher bar comes into position for contacting a head 13. In such embodiment, the track extends along a surface of the system 30, around the discharge end 29 of the system 30, below the system 30, and around the in-feed end 27 of the system 30. FIG. 6 illustrates a configuration of a pusher bar 42. As shown, the pusher bar 42 may be provided with a plurality of extensions 47 extending towards the discharge end 27 of the system 30 while in position to advance a hog head 13 along the system 30. The extensions 47 may engage the hog head 13. Alternatively, no extensions 47 may be provided. It is not necessary that the pusher bar 42 actively engage the head. For example, in systems where it is necessary to minimize head movement, fingers may be provided for insertion into, for example, the mouth to actively engage the and stabilize the head. Such stabilization is not necessary in the present system.

Figure 8:
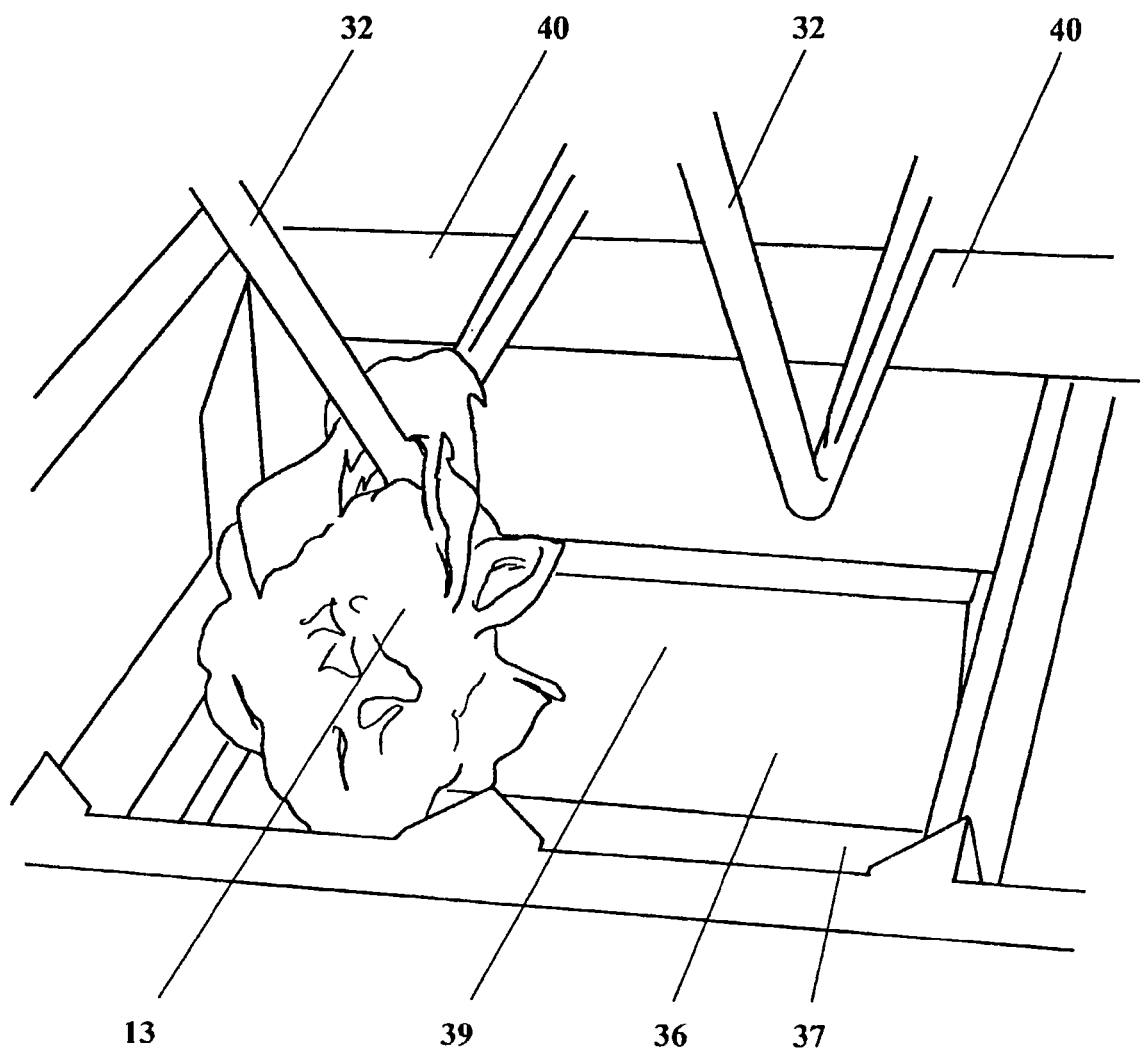
FIG. 8 is a photographic view of a hog head coming into position above the clamp in accordance with one embodiment of the present invention.

FIG. 8 illustrates a hog head 13 generally in position for retaining of the snout by a fastener such as clamp 36. The clamp 36 is provided for grasping or clamping the snout. The clamp 36 may be actuated to grasp the snout. Forward movement of the head by the pusher bar 42, as will be described more fully below, or direct movement of the clamp 36 according to an alternate embodiment, operates to pull the snout from the head. After tearing of the snout from the head 13, the clamp may be actuated to release the snout onto a conveyor belt 44 for transferring to a collection device. In an alternate embodiment, the removed snout may be deposited directly into a collection device.

As shown in FIGS. 9 through 11, the clamp 36 comprises a clamp door 37 and a drop door 39. FIG. 10 illustrates a clamp door 37 and FIG. 11 illustrates a drop door 39. The clamp door 37 is positioned towards the in-feed end 27 of the system 30 and the drop door is positioned towards the discharge end 29 of the system 30. The clamp door 37 and drop door 39 are closed around the snout to grasp the snout. The doors 37 and 39 may each comprise a single sheet of material with the facing edges 41 being beveled. The beveled edges 41 may be configured to complement one another. Thus, for example, the beveled edge 41 of the clamp door may angle upwardly at 45 degrees while the beveled edge 41 of the drop door angles downwardly at 45 degrees. In this example, when the beveled edges 41 meet, they are flush to one another. As shown the clamp door 37 is movable towards and away from the drop door 39 while the drop door 39 is pivotable over approximately 90 degrees. Thus, in the closed position, the clamp door 37 and the drop door 39 are flush with a surface of the system 30, the facing edges 41 substantially meeting. A gap of, for example, 1/8" may be provided between the facing edges 41 to minimize the likelihood of tearing on the snout. In the open position, the clamp door 37 retracts towards the in-feed end 27 of the system 30, with the edge opposite the facing edge 41 pivoting downwardly approximately 30 degrees. The drop door 39, in the open position, extends slightly towards the in-feed end 27 of the system, revealing a curved portion 45, the drop door 39 pivoting 90 degrees to extend substantially downwardly. Before actuation to retain the snout, the doors 37, 39 may be in an open position for accepting the snout. Alternately, only one of the doors 37 or 39 may be in an open position provided sufficient clearance is given for the snout to drop between the facing edges 41 of the doors 37, 39. In alternate embodiments, other opening and closing configurations may be used.

Figure 12:
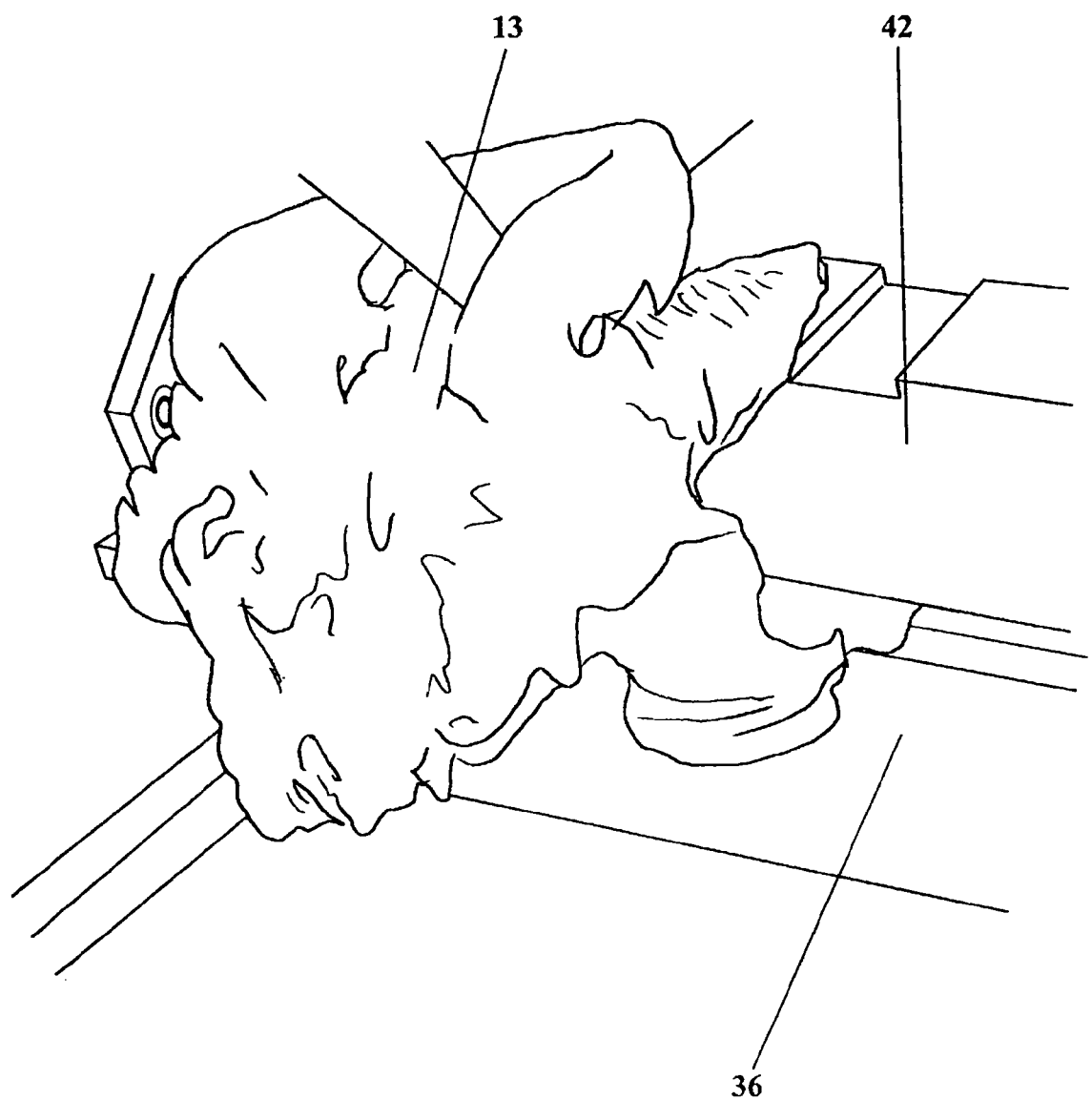
FIG. 12 is a photographic view of the clamp door of FIG. 4 being closed around a hog snout in accordance with one embodiment of the present invention.

In one embodiment, as a pusher bar 42 contacts the hog head, the pusher bar 42 engages a switch that activates the doors 37, 39. The doors 37, 39 actuate to the closed position and grasp the snout. After the snout is grasped by clamp 36, the hog head is advanced from the in-feed rod 32 to the horn assembly 40. As the hog head is advanced, the clamp 36 continues to grasp the snout and the snout is torn from the hog head. After the snout is torn, the snout drops into a collection device or onto a conveyor 44 for transferring (for example, see FIG. 15). Generally, removal of the snout removes faceplate tissue with the snout. FIG. 9 is a photographic view of a clamp 36 in accordance with one embodiment of the hog head processing system. FIG. 8 is a photographic view of a hog head being positioned above a clamp 36. FIG. 12 is a photographic view of a clamp 36 closing around a snout. The clamp is positioned towards the in-feed end 27 of the machine such that the system functions to remove the snout from the hog head prior to separating the jaw from the hog head.

In removing the snout from the hog head 13 prior to separating the jaw from the hog head 13, the snout is grasped while the hog head 13 is relatively stationary. In contrast, if the jaw is separated from the hog head 13 prior to removing the snout, the separation of the jaw may operate to move the hog head, to tilt the hog head, or to otherwise position the hog head in a manner unsuitable for grasping by a clamp. Using the present system 30, the hog head 13 is positioned for grasping of the snout by the clamp 36 after being fed onto the in-feed rod 32. As shown and described, it is not necessary to include additional components for stabilizing the head.

Figure 13:
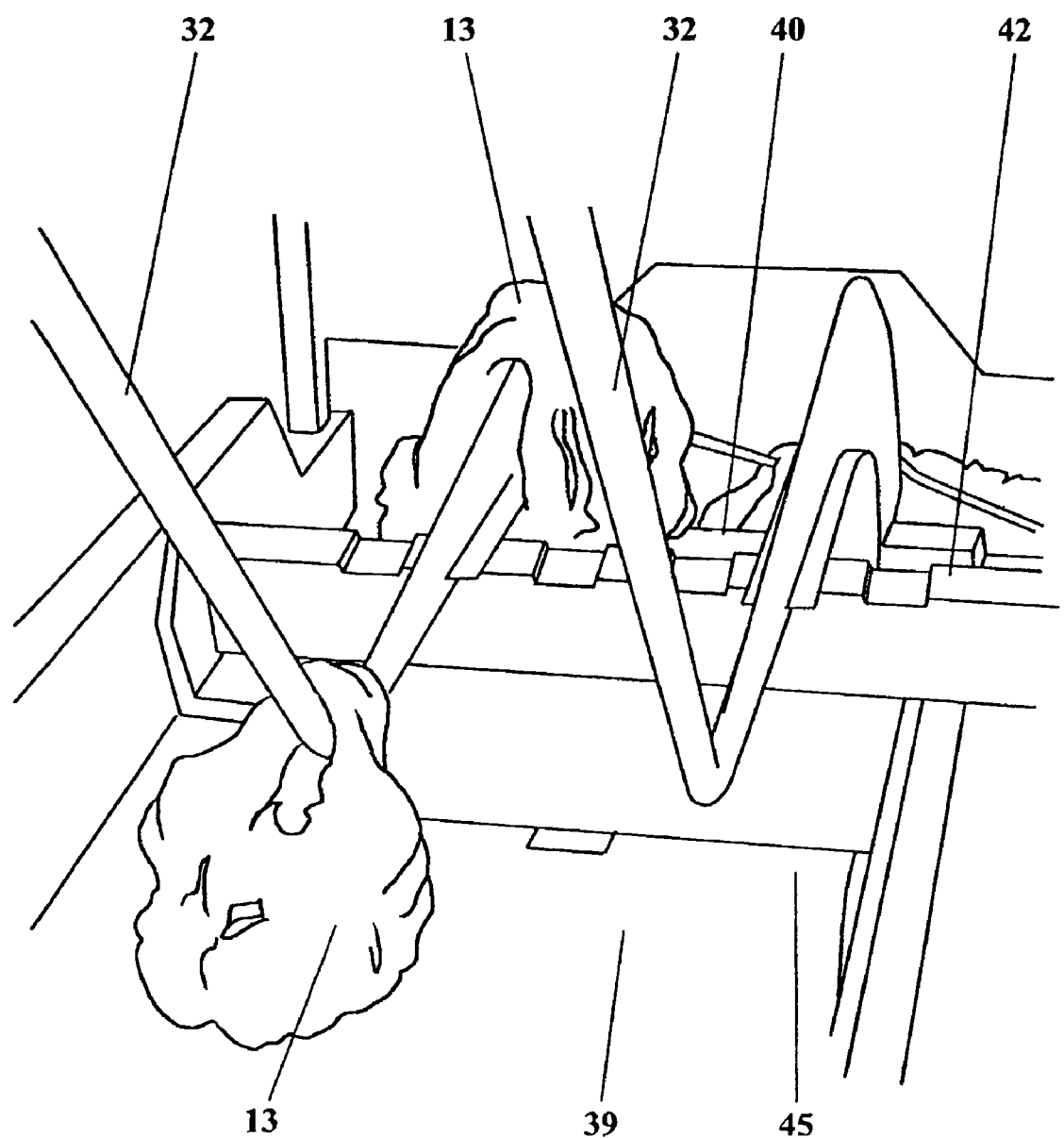
FIG. 13 is a photographic view of an in-feed rod and a horn assembly of a hog head processing system in accordance with one embodiment of the present invention.

Returning to FIG. 2, after the snout is separated from the hog head, the hog head 13 is advanced along the in-feed rod 32 onto a horn assembly 40. Again, FIG. 4 illustrates an exemplary embodiment of integral in-feed rods 32 and horn assembly 40. Advancement of the hog head along the horn assembly 40, for example using the pusher bar 42, operates to break the lower jaw and separate the lower jaw from the hog head. As shown in FIGS. 4 and 13, the horn assembly is relatively tapered where it meets the in-feed rod 32. The horn assembly 40 increases in depth towards the discharge end 29 of the system 30. At the convergence of the in-feed rod 32 and the horn assembly 40, the horn assembly 40 has a depth of approximately 1 inch. In position, the jaw of the hog head 13 is positioned along an upper edge 51 of the horn assembly 40 while the upper head is positioned along a lower edge 49 of the horn assembly 40. The horn assembly 40 extends at an angle $\alpha_3$ to position b. In one embodiment, angle $\alpha_3$ ranges from approximately 70 degrees to approximately 75 degrees. At the beginning of angle $\alpha_3$, at position a, the depth of the horn assembly 40 is approximately 3 inches. Midway along angle $\alpha_3$, at approximately position b, the depth of the horn assembly may be approximately 9 inches. By position c of the horn assembly 40, the depth of the horn assembly may be approximately 11 inches. Thus, in one embodiment, over the course of angle $\alpha_3$, the depth of the horn assembly increases from a depth of approximately 3 inches at position a to a depth of approximately 9 inches at position b to a depth of approximately 11 inches at position c. As shown, the horn assembly may be configured to remains substantially the same width, or approximately 1 inch, along the length of the horn assembly 40. Thus, the relative loading position of the hog head on the horn assembly 40 stays generally stable. The horn assembly 40 increases in downward extension in the direction of hog head advancement.

During advancement of the hog head 13 over the horn assembly 40, the lower jaw of the hog head 13 is broken and separated. The separated jaw drops from the upper edge 51 of the horn assembly 40. It is not necessary to provide a separate device for collecting the jaw from the horn assembly 40. Further, it is not necessary to provide a mechanism to control head movement during or after separation of the jaw. By separating the lower jaw as provided by the horn assembly described, temple meat is accessible.

As shown, the clamp 26 actuates to grasp and retain the snout. The pusher bar 42 advances the hog head, the snout being torn from the head during advancement of the hog head, along the horn assembly 40. The in-feed rod 32 and the horn assembly 40 are stationary with the hog head being advanced along the in-feed rod 32 for snout removal using a clamp 36 and further advanced along the horn assembly 40 for separation of the lower jaw.

Figure 14:
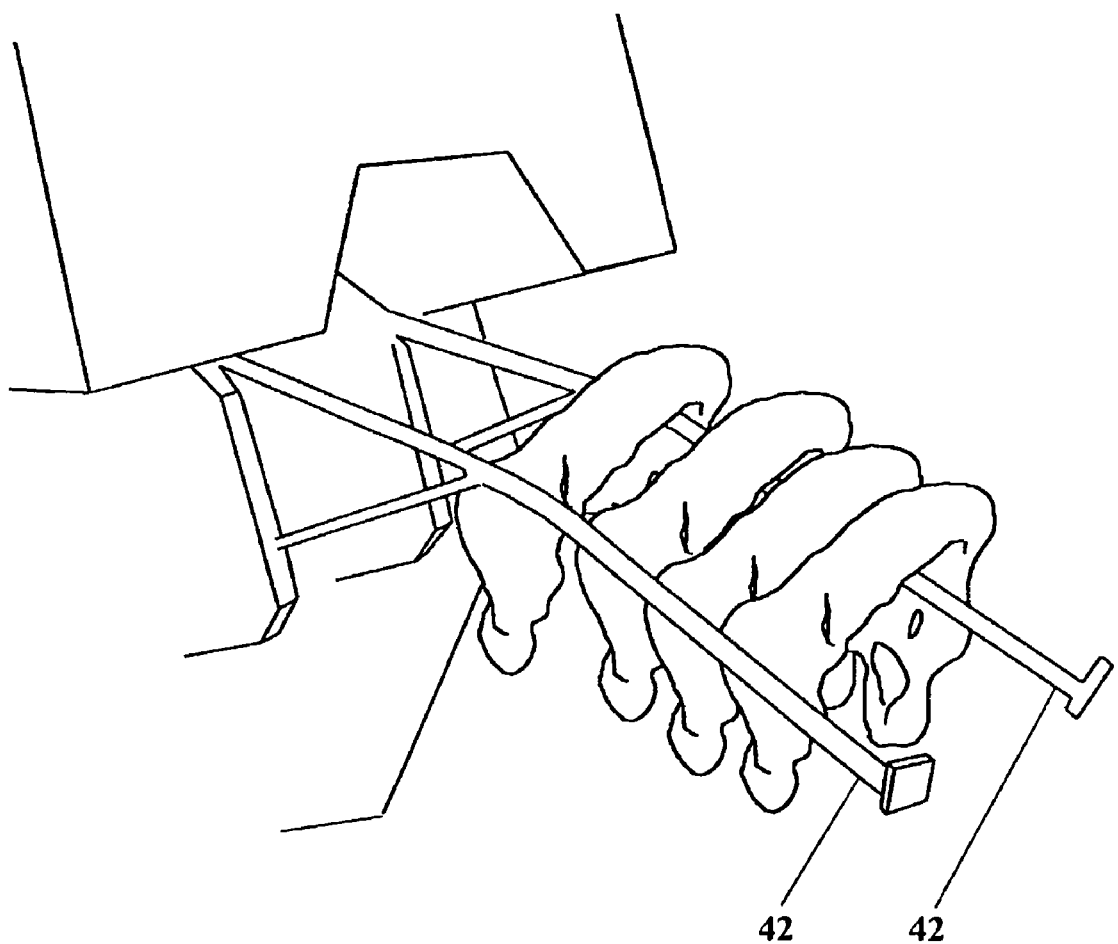
FIG. 14 is a photographic view of processed hog heads positioned along a discharge bar in accordance with one embodiment of the present invention.

A discharge bar 42 may be provided coupled to the discharge end of the horn assembly 40 proximate the angle $\alpha_3$. In an embodiment where a discharge bar 42 is provided, the separate jaw slides from the horn assembly 40 onto the discharge bar 42. FIG. 14 illustrates separated jaws positioned along a discharge bar 42.

The processed hog heads fall from the horn assembly 40 at the discharge end 29 of the system 30. A conveyor belt may be provided to transfer the processed heads from the system 30. Alternatively, other transfer means or a collection device may be provided for receiving the processed heads from the horn assembly 40.

Figure 15:
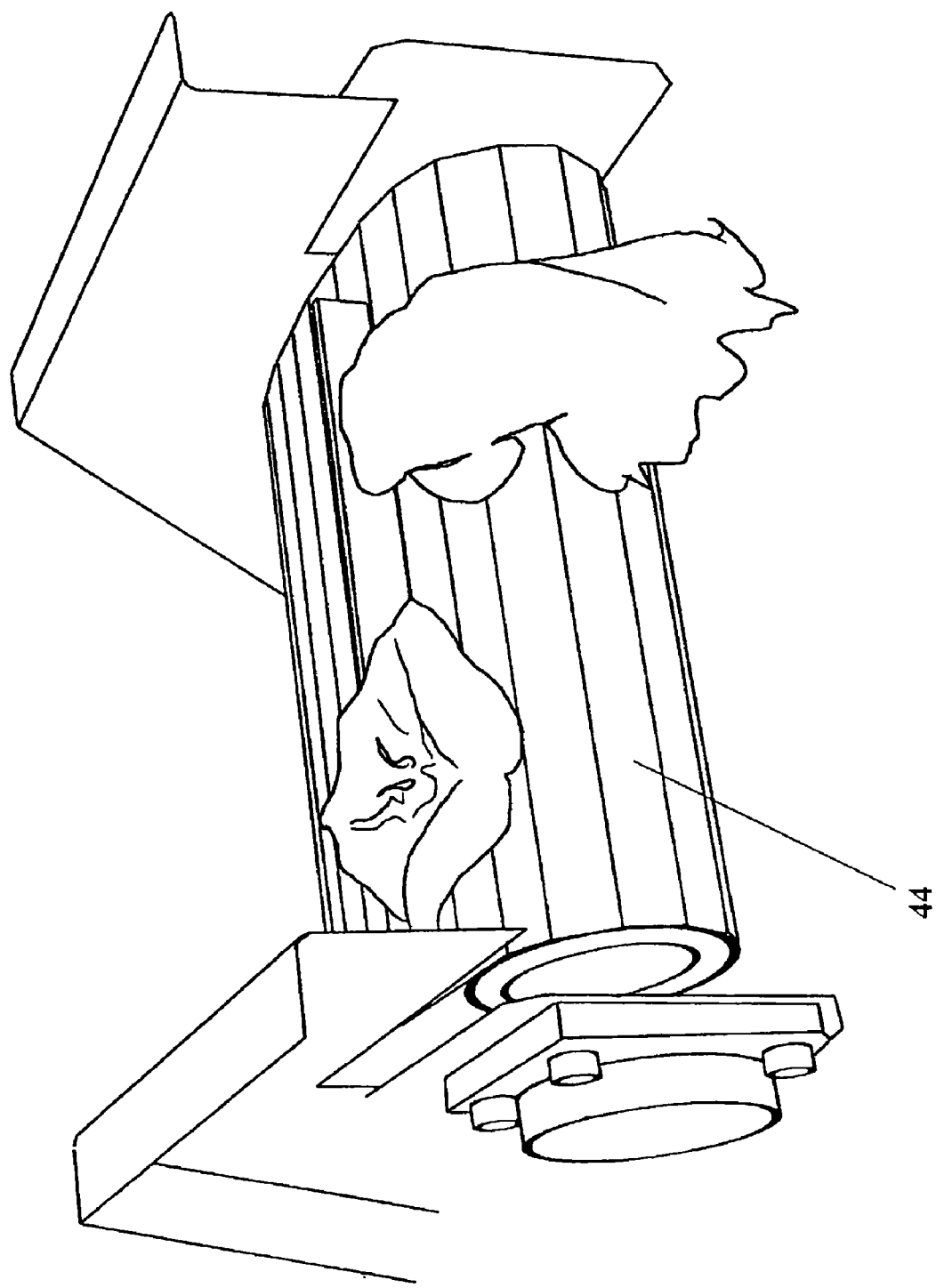
FIG. 15 is a photographic view of removed hog snouts on a conveyor belt in accordance with one embodiment of the present invention.
Figure 16:
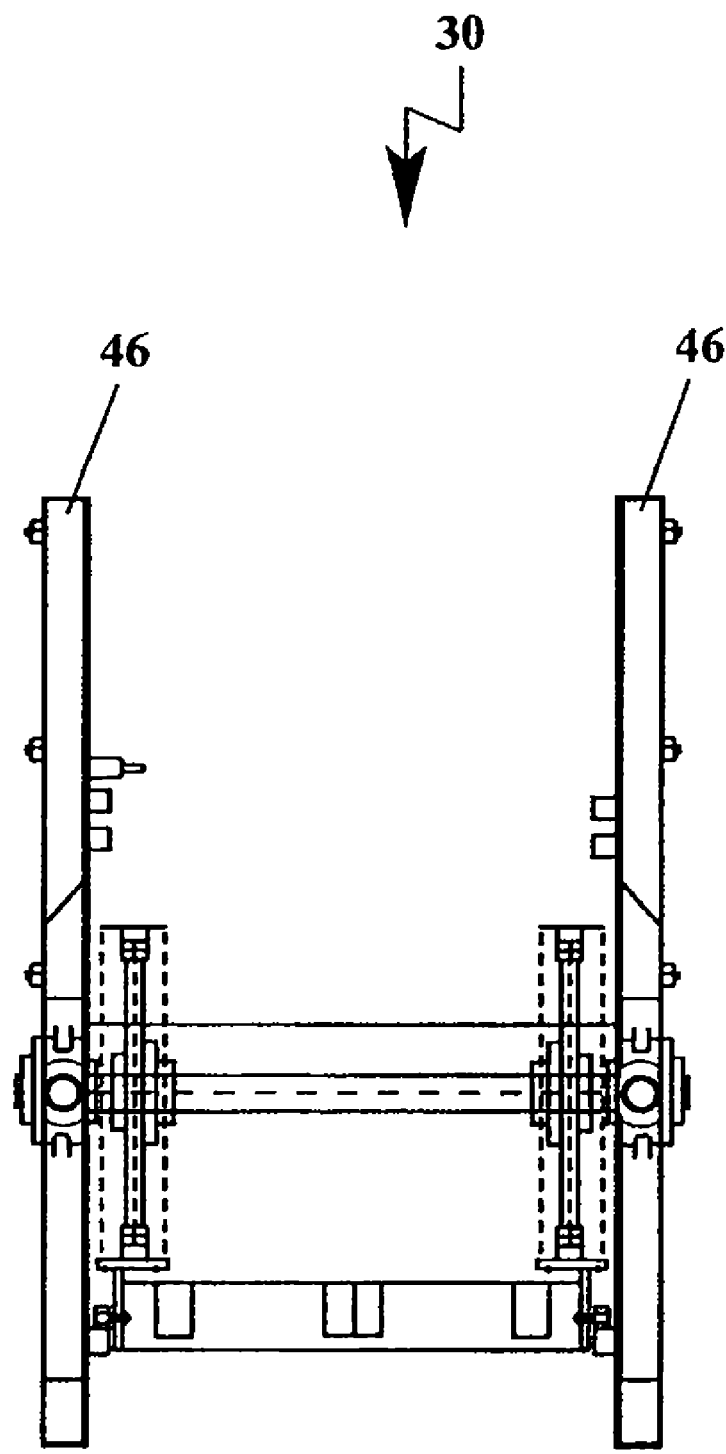
FIG. 16 is a view, partially in section, as viewed along line D-D of FIG. 2.
Figure 17:
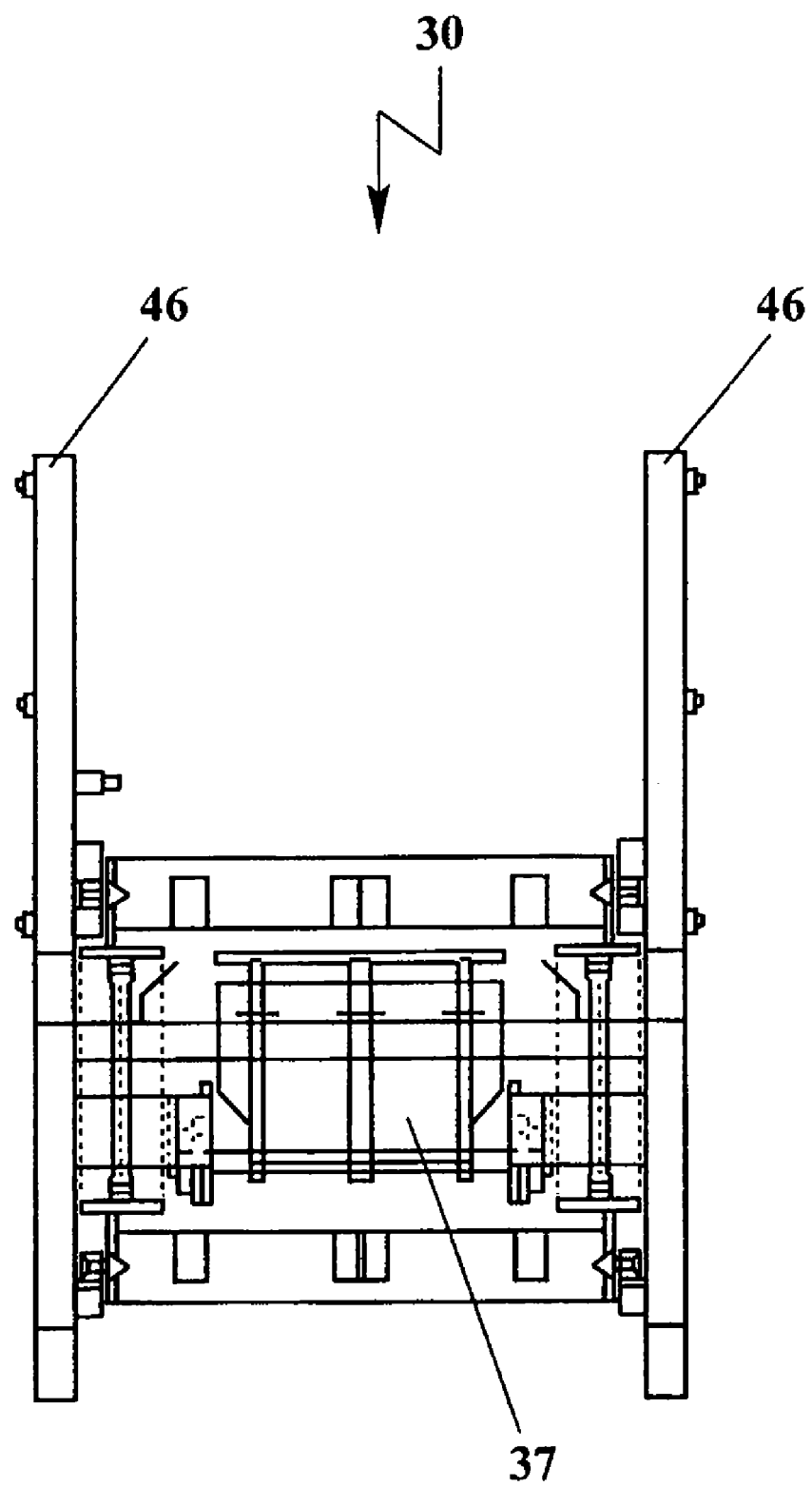
FIG. 17 is a view, partially in section, as viewed along line C-C of FIG. 2.
Figure 18:
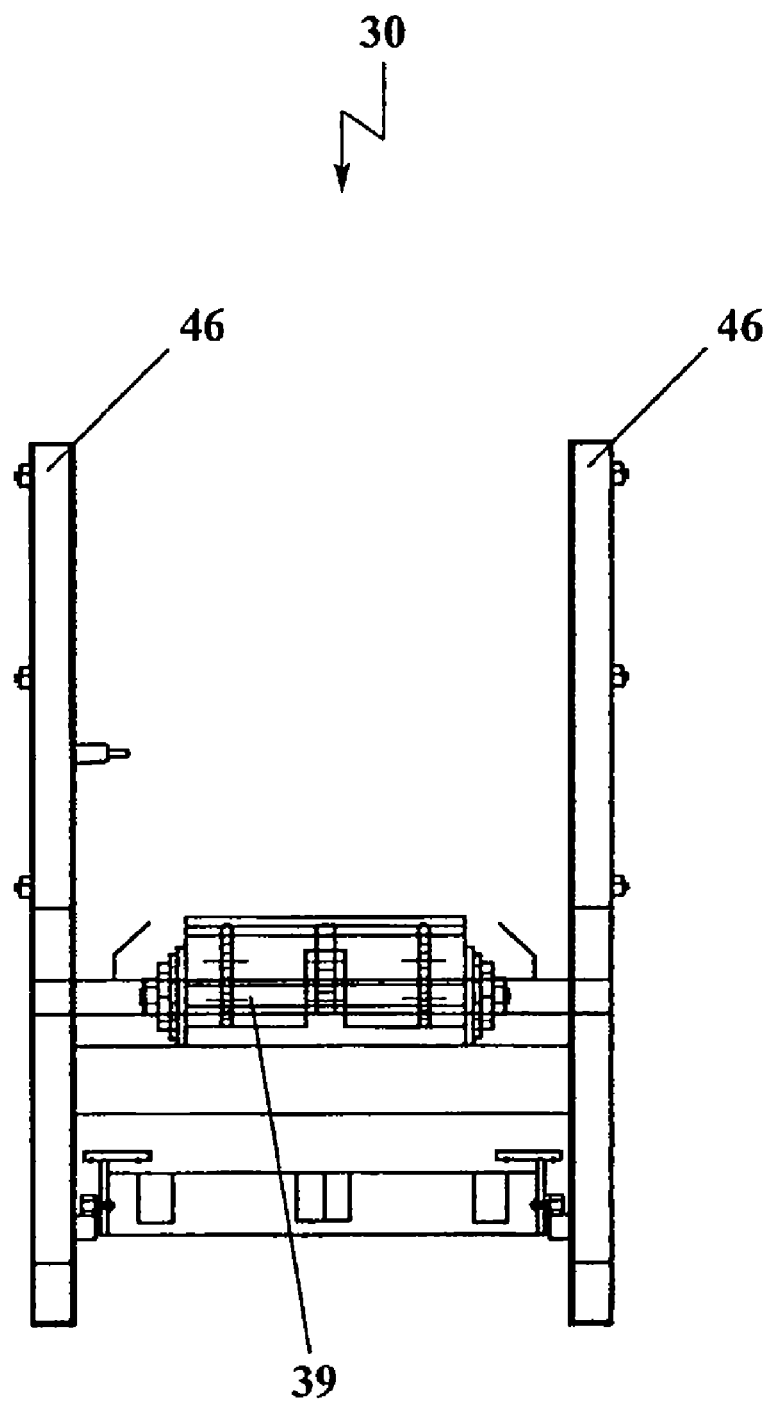
FIG. 18 is a view, partially in section, as viewed line B-B of FIG. 2.
Figure 19:
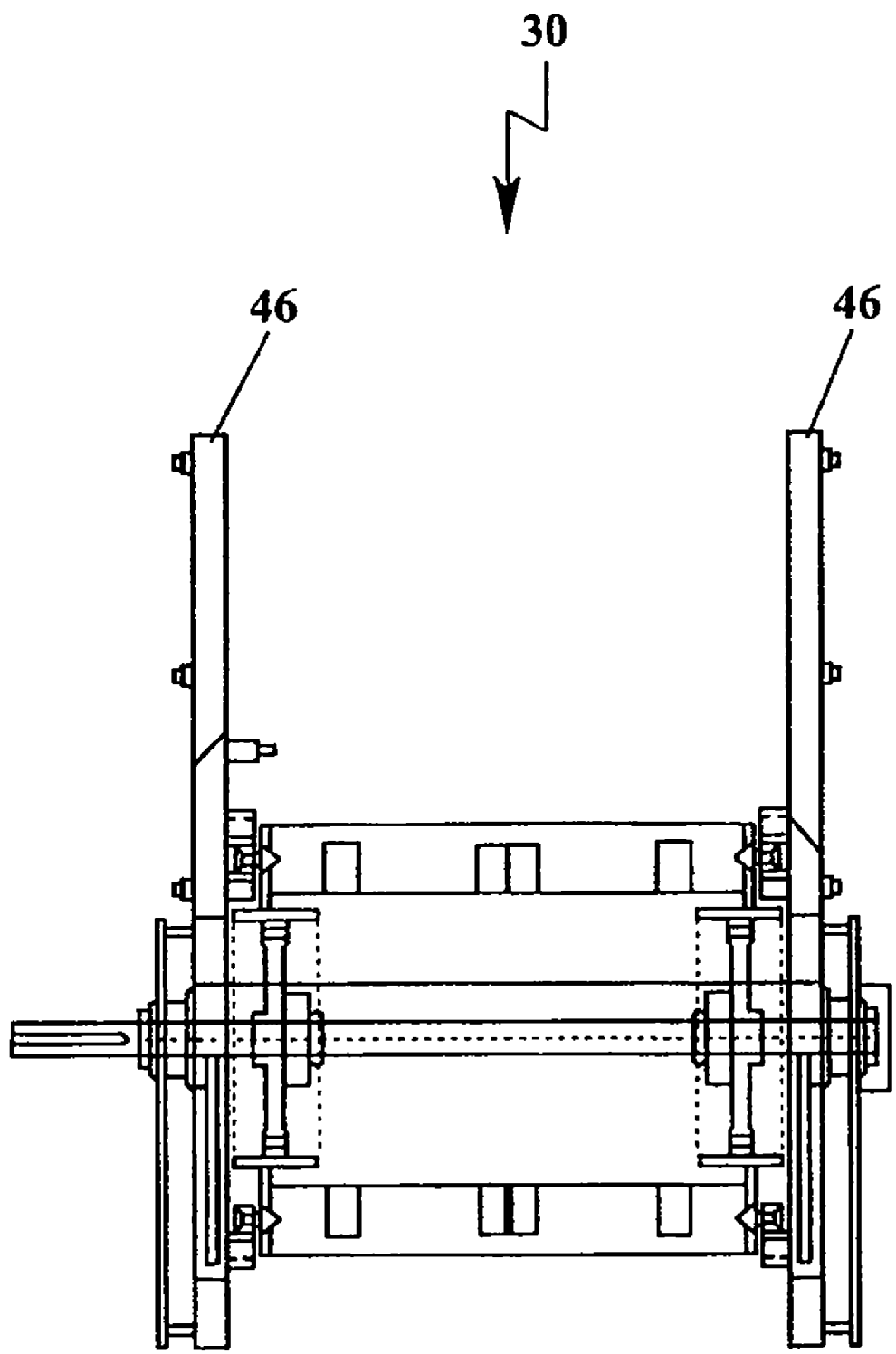
FIG. 19 is a view, partially in section, as viewed line A-A of FIG. 2.

As discussed above, the removed hog snouts drop through the clamp doors 37, 39 onto a conveyor or other transfer device or into a collection device. In one embodiment, a conveyor is provided between supports of the system near ground level. The conveyor 44 receives removed snouts as the snouts are removed by the claim 36. FIG. 15 illustrates removed hog snouts being transferred by such a conveyor 44.

As shown in the figures, the system may be provided with dual processing units substantially parallel to one another. That is, the system may include two in-feed rods 32 and two horn assemblies 40. In such dual configuration, a single clamp 36 and pusher bar 42 may be provided. Thus, a first hog head may be fed onto a first in-feed rod while a second hog head is fed onto a second in-feed rod. Upon proper positioning of the first and second hog heads above the clamp, the pusher bar contacts the first and second heads. The clamp actuates to grasp the snouts of the first and second heads and the pusher bar advances the first and second heads along the first and second horn assemblies. The lower jaw of each of the heads is separated as the pusher bar advances the heads.

FIGS. 16 through 19 illustrate cross-sectional views taken along lines D-D, C-C, B-B, and A-A of FIG. 2. As shown in FIGS. 16 through 19, grates 46 may be provided along the edges of the hog head processing system 30 in the direction of hog head advancement. The grates 46, thus prevent access into the system 30 except for from above or in the direction of hog head advancement.

Figure 20:
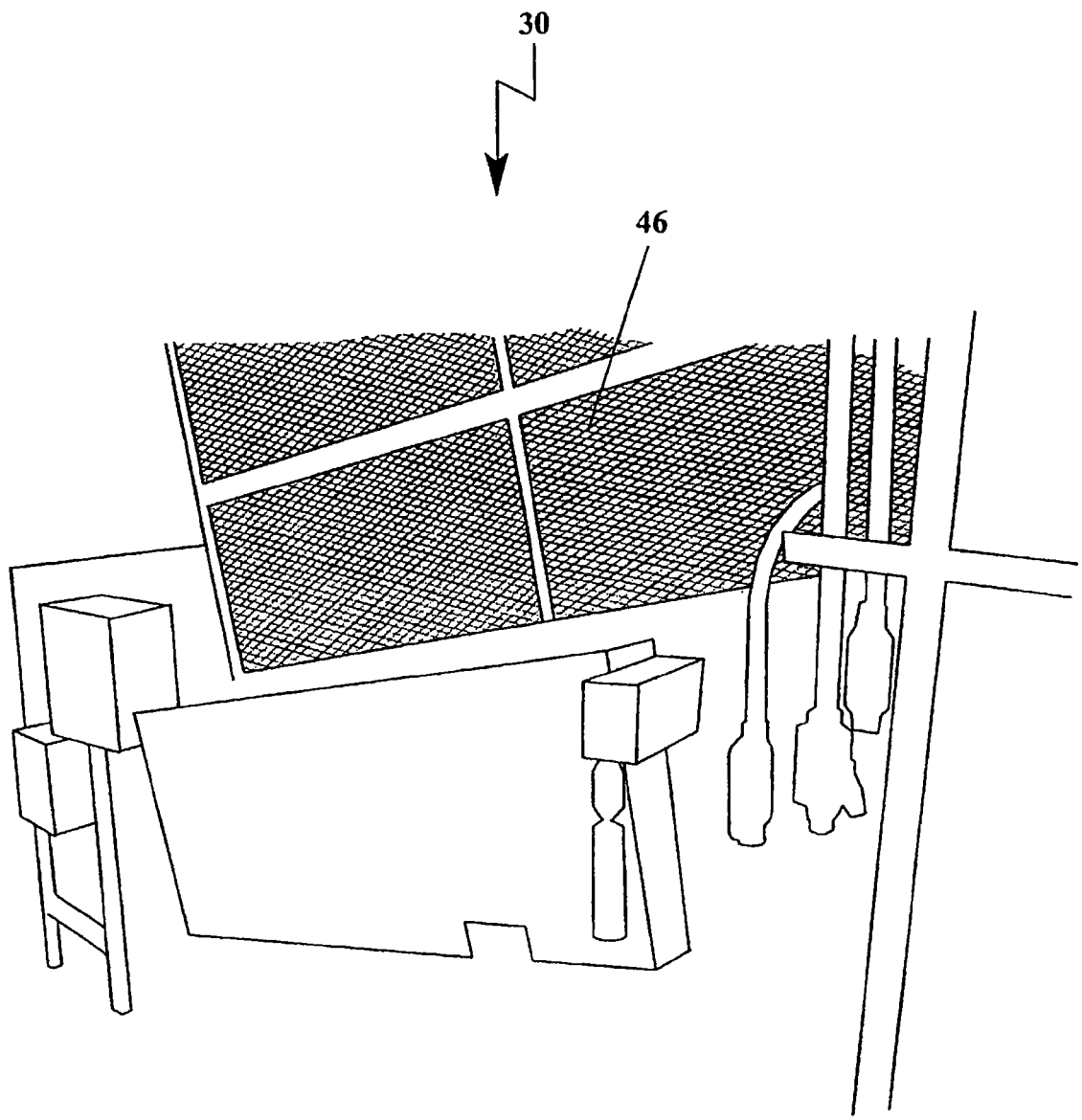
FIG. 20 is a photographic view of a side view of a hog head processing system in accordance with one embodiment of the present invention.
Figure 21:
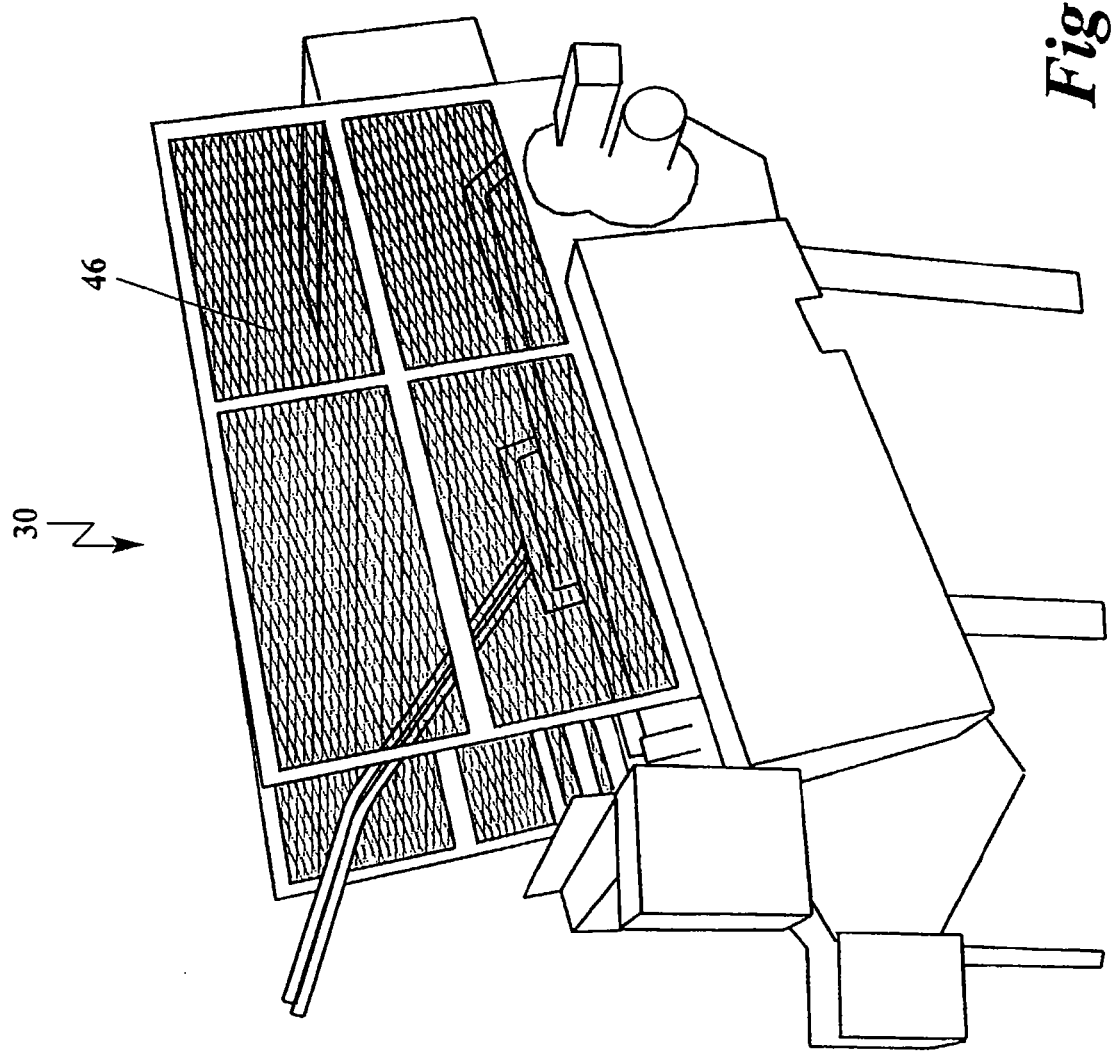
FIG. 21 is a photographic view of a side view of a hog head processing system in accordance with one embodiment of the present invention.

FIGS. 20 and 21 illustrate photographic views of the system as viewed from the side.

Although the invention has been described with reference to preferred embodiments, persons skilled in the art will recognize that changes may be made in form and detail without departing from the spirit and scope of the invention.

The invention claimed is:

1. A head meat processing system comprising:
   a positioner for receiving a head and for positioning the head relative to a fastener for grasping a portion of the head;
   a member for advancing the head from the positioner onto a separation assembly along a processing direction while the portion is grasped by the fastener, wherein the grasped portion is removed from the head during such advancement along the processing direction; and
   a separation assembly operatively coupled to the positioner and for separating a lower jaw from the head while the head is advanced along the separation assembly in the processing direction, the separation assembly comprising a tapered portion that increases in at least one dimension along the processing direction from a first end to a second end wherein the second end has at least one dimension capable of separating the lower jaw from the head.

2. The system of claim 1, wherein the head comprises a hog head and the portion of the head grasped by the fastener comprises a snout.

3. The system of claim 1, wherein the positioner comprises an in-feed rod.

4. The system of claim 1, wherein the separation assembly comprises a horn assembly.

5. The system of claim 1, wherein the positioner and the separation assembly are integral.

6. The system of claim 1, wherein the member for advancing the head comprises a plurality of extensions for contacting the head.

7. The system of claim 1, wherein the member for advancing the head is configured for activating the fastener when the head is in position for grasping of the portion by the fastener.

8. The system of claim 1, further comprising a track having a plurality of members for contacting a head.

9. The system of claim 1, further comprising a discharge bar for receiving the separated lower jaw from the separation assembly.

10. A head meat processing method comprising:
    positioning a head relative to a fastener;
    grasping a portion of the head with the fastener;
    removing the portion of the head grasped by the fastener from the head;
    advancing the head with the removed portion of the head along a separation assembly comprising a tapered portion that increases in at least one dimension from a first end to a second end wherein the second end has at least one dimension capable of separating a lower jaw from the head; and
    separating a lower jaw from the head.

11. The method of claim 10, wherein the head is positioned on a positioner in an inverted position and the head is advanced along the positioner to position the head above the fastener.

12. The method of claim 10, wherein removing the portion from the head is performed by advancing the head while the portion is grasped by the fastener.

13. The method of claim 10, wherein removing the portion from the head is performed by moving the fastener while the portion is grasped by the fastener and maintaining a position of the head.

14. The method of claim 10, wherein separation of the lower jaw from the head is performed by advancing the head along the separation assembly.

15. The method of claim 10, further comprising releasing the portion after the portion has been removed from the head.

16. The method of claim 10, wherein the portion is removed before the lower jaw is separated.

17. The method of claim 10, wherein the head comprises a hog head and the portion of the head grasped by the fastener comprises a snout.

18. A head meat processing system, the system having an in-feed end and a discharge end, comprising:
    a rod for receiving a head and for positioning the head, a portion of the rod being positioned at the in-feed end of the system;
    a fastener for grasping a portion of the head, the fastener comprising a clamp door and a drop door wherein the clamp door is positioned towards the in-feed end of the system and the drop door is positioned near the discharge end of the system;
    a pusher bar for advancing the head from the rod onto a horn assembly while the portion is clamped, wherein the portion is removed from the head during such advancement;
    a horn assembly for separating a lower jaw from the head while the head is advanced along the horn assembly, the horn assembly being operatively coupled to the rod and a portion of the horn assembly being positioned at the discharge end of the system; and
    a discharge bar coupled to the portion of the horn assembly positioned at the discharge end of the system, the discharge bar receiving the separated lower jaw from the horn assembly;
    wherein the system tilts upwardly from the in-feed end to the discharge end.

19. A head meat processing system comprising:
    a means for receiving a head and for positioning the head relative to
    a means for grasping a portion of the head;
    a means for advancing the head while the portion of the head is grasped, wherein the means for advancing the head causes the grasped portion of the head to be removed from the head and causes separation of the lower jaw from the head while the head is advanced.

20. The system of claim 19, wherein the head comprises a hog head and the portion of the head grasped by the fastener comprises a snout.

21. The system of claim 19, wherein the means for receiving and positioning the head comprises an in-feed rod.

22. The system of claim 19, wherein the means for advancing the head comprises a horn assembly.

23. The system of claim 19, wherein the means for advancing the head comprises a plurality of extensions for contacting the head.

24. The system of claim 19, further comprising a track having a plurality of members for contacting a head.

25. The system of claim 19, further comprising a discharge bar for receiving the separated lower jaw from the means for advancing the head.

26. A head meat processing method comprising:
    positioning a head relative to a fastener;
    grasping a portion of the head with the fastener;
    removing the grasped portion from the head;
    advancing the head with the removed portion along a separation assembly; and separating a lower jaw from the head;
    wherein the head is positioned on a positioner in an inverted position and the head is advanced along the positioner to position the head relative to the fastener.

27. The method of claim 26, comprising removing the grasped portion from the head by advancing the head while the portion is grasped by the fastener.

28. The method of claim 26, comprising removing the portion from the head by moving the fastener while the portion is grasped by the fastener and maintaining a position of the head.

29. The method of claim 26, comprising separating the lower jaw from the head by advancing the head along the separation assembly.

30. The method of claim 26, further comprising releasing the grasped portion after the grasped portion has been removed from the head.

31. The method of claim 26, comprising removing the grasped portion before the lower jaw is separated from the head.

32. The method of claim 26, wherein the head comprises a hog head and the portion of the head grasped by the fastener comprises a snout.

33. A head meat processing method comprising:
positioning a head relative to a fastener;
grasping a portion of the head with the fastener;
removing the grasped portion from the head;
advancing the head with the removed portion along a separation assembly; and
separating a lower jaw from the head;
wherein removing the portion from the head is performed by advancing the head while the portion is grasped by the fastener.

34. The method of claim 33, comprising positioning the head on a positioner in an inverted position and advancing the head along the positioner to position the head above the fastener.

35. The method of claim 33, comprising removing the portion from the head by moving the fastener while the portion is grasped by the fastener and maintaining a position of the head.

36. The method of claim 33, comprising separating the lower jaw from the head by advancing the head along the separation assembly.

37. The method of claim 33, further comprising releasing the grasped portion after the grasped portion has been removed from the head.

38. The method of claim 33, comprising removing the grasped portion before the lower jaw is separated from the head.

39. The method of claim 33, wherein the head comprises a hog head and the portion of the head grasped by the fastener comprises a snout.

40. The system of claim 1, wherein the at least one dimension comprises one or more of depth, diameter, length, width, and volume.

41. The method of claim 10, wherein the at least one dimension comprises one or more of depth, diameter, length, width, and volume.

* * * * *